Patented Sept. 1, 1953

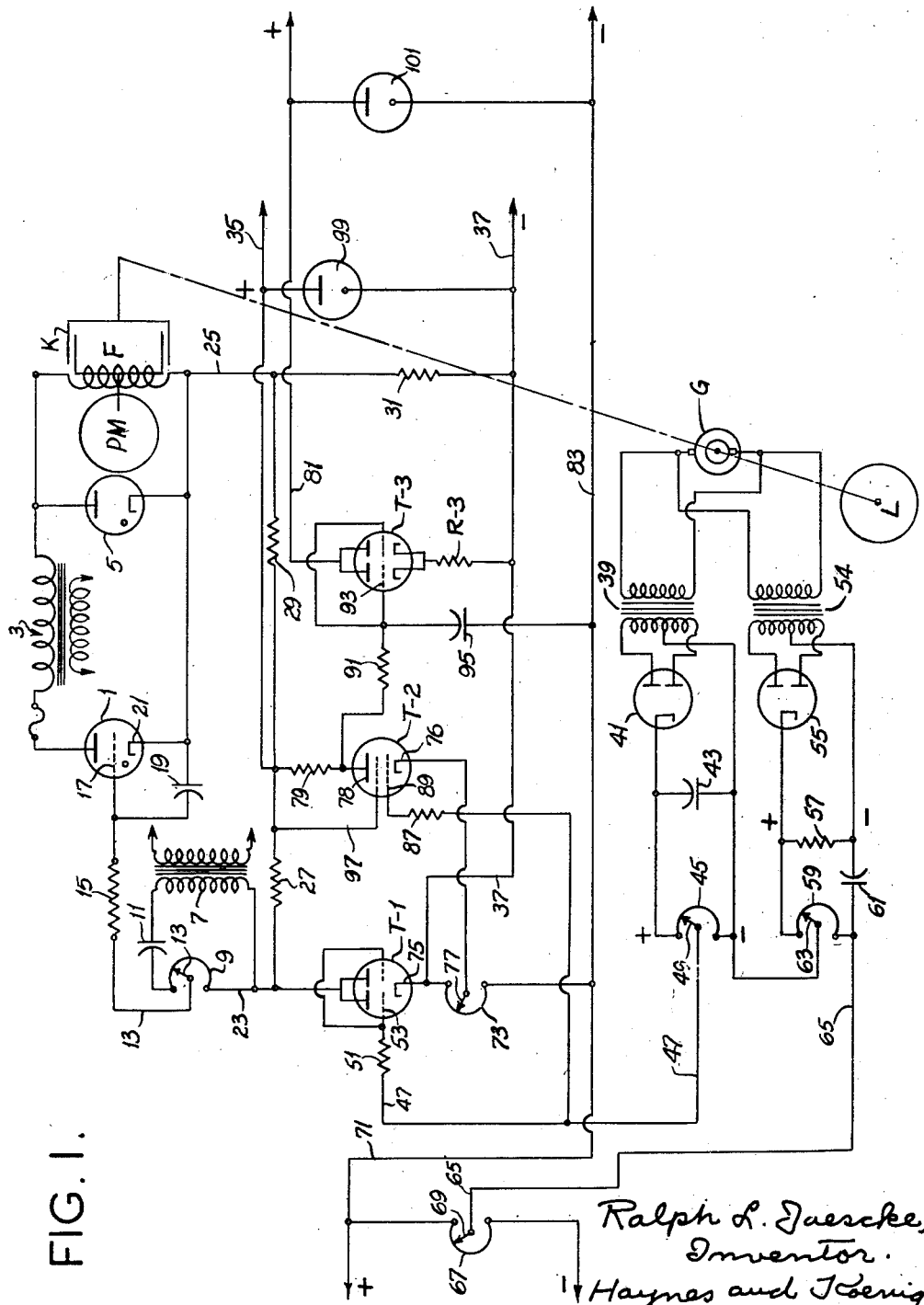

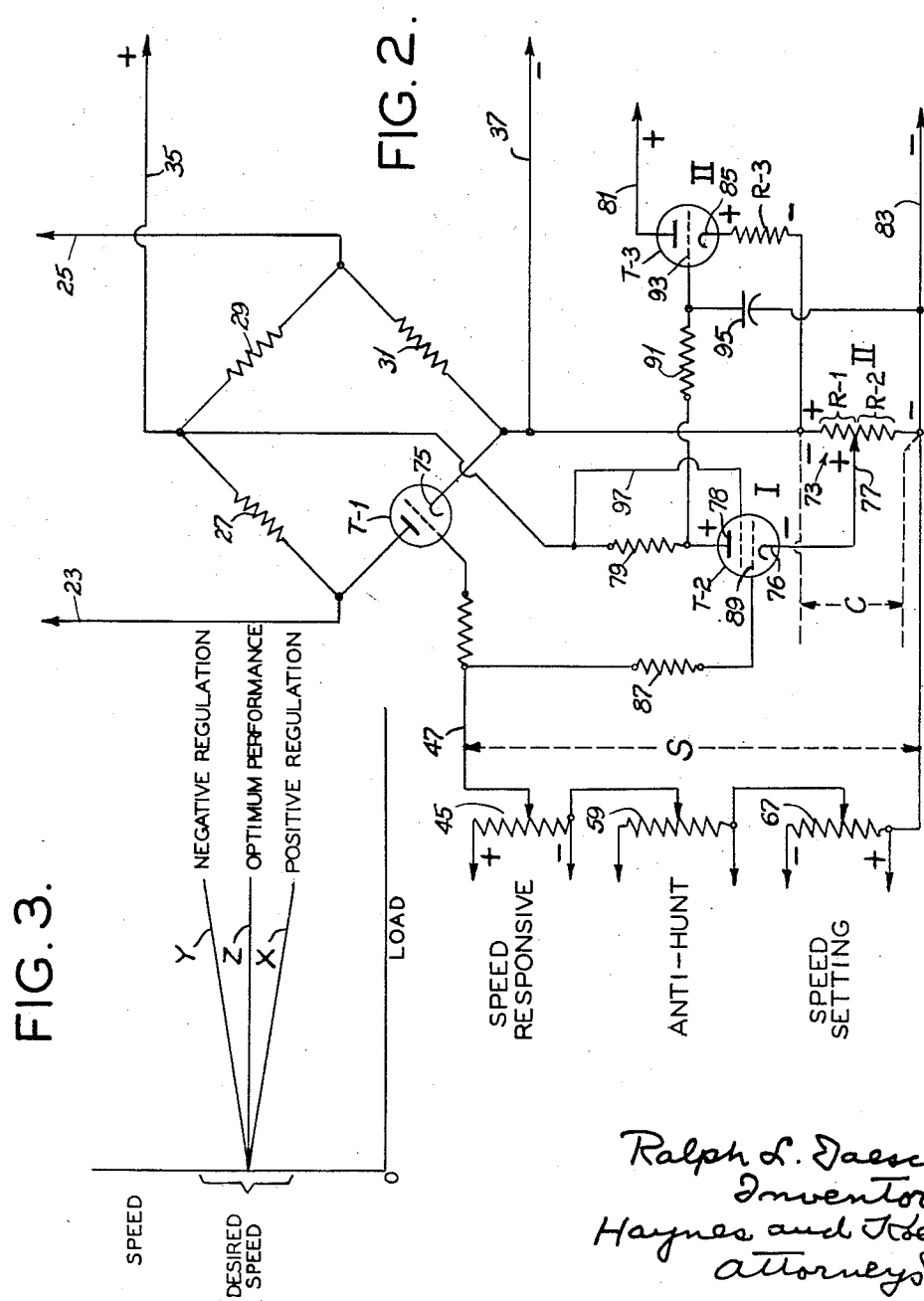

2,650,996

UNITED STATES PATENT OFFICE 2,650,996

REGULATING CONTROL AND REGENERATIVE CIRCUIT

Ralph L. Jaeschke, Kenosha, Wis., assignor to Dynamatic Corporation, Kenosha, Wis., a corporation of Delaware Application August 24, 1950, Serial No. 181,307

12 Claims. (Cl. 310—95)

This invention relates to controls, and more particularly, to regulating control circuits for feeding back into a controlled system a function of the condition being regulated.

Regulating controls for keeping constant some condition such as speed, temperature, voltage or the like operate on the principle of having an input continuously responsive to the controlled condition which is fed to means providing a correction which is continuously responsive to the input. In such a feedback control, it is normally not possible to maintain the regulated condition absolutely constant in value because variations in the correcting force are provided by deviations in the actual condition from the desired predetermined condition of the system, that is, the reference point. The amount of this deviation may be reduced considerably by amplifying the condition-responsive input so that a smaller deviation in the input produces a great correcting force, but the deviation is not completely eliminated. Absolute control of the value is possible only if the reference point itself is also changed. For example, if a speed regulating control has a speed deviation of 10 R. P. M. from no load to full load torque and the desired speed or reference point is 1000 R. P. M., then it would be necessary to change the reference point from 1000 to 1010 R. P. M. as the torque is increased from no load to full load torque in order to have an actual speed of 1000 R. P. M. at full load torque. The control of this invention produces such an effect although the input is continuously responsive to the regulated condition of the system. Moreover the present system includes sufficient damping effect substantially to eliminate hunting about the stated absolute value to be maintained.

A stable rotating system operates by decreasing its speed upon load increases, the deviation in speed being a function of the deviation in load. A regulating control may be employed to reduce the amount of deviation in speed caused by a deviation in load, but the regulation remains positive. That is, the usual regulating control merely reduces the ratio of speed deviation to torque deviation. The control of this invention not only provides the usual characteristics of a regulator, but further is adjustable to provide negative regulation, i. e. speed increase upon load increase. Moreover, the adjustment is smoothly made from a point giving positive regulation through a point giving theoretically perfect regulation to a point giving negative regulation.

Briefly, the control comprises a primary triode or variable-impedance means controlling the correcting force supplied to the regulated system. For example, the triode may control the excitation of an electromagnetic slip-coupling in such a manner that the speed of the driven member of the coupling is maintained constant. The grid signal for the primary triode includes a fast-response component continuously responsive to the regulated condition and a delayed-response component herein termed a corrective reference. In the example referred to above, the first component is continuously responsive to the speed of the driven member of the coupling. The other component is supplied by a closed loop type of circuit providing adjustable regenerative feedback. Also, the loop circuit is self-sustaining in the sense that a temporary change in the regulated condition causes a relatively permanent change in the corrective reference. This self-sustaining feature of operation is obtained from two triode-controlled circuit parts arranged so that the conductivity of either triode is a function of the other's conductivity. A signal continuously responsive to the regulated condition is adapted initially to change the grid bias of the triode in the first circuit part. The resulting change in the first triode's conductivity causes a corresponding change in the grid bias of the second triode. The second triode, then causes a change in the grid bias for the first triode. If this change in grid bias is below that caused initially by the condition-responsive signal, positive regulation results. If this change in grid bias for the first triode caused by the second triode exceeds the initial change in the condition-responsive signal, then negative regulation occurs. The control has means for adjusting the value of this change so that it closely approaches the change in the condition-responsive signal, thereby permitting the condition-responsive signal to return to its original value and provide near perfect speed regulation. A new value of the corrective reference signal results although the condition-responsive signal returns to its original value. Thus, in the example of an electric slip-coupling, a change in load torque causes a temporary change in the speed and in the speed-responsive signal. This temporary change in the speed-responsive signal causes the corrective reference signal to assume a new value compensating for the new load, thereby permitting the speed to return to its original value while the corrective reference signal remains at its new value. In addition to the above, the control circuit possesses considerable stability and includes means adapted to prevent hunting of the controlled condition. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Fig. 1 is a circuit diagram of this invention;

Fig. 2 is a simplified circuit diagram of certain parts of Fig. 1; and

Fig. 3 is a chart illustrating certain comparative performances.

Similar reference characters indicate corresponding parts throughout the several views of the drawings.

Referring now to Fig. 1 of the drawing, there is shown an electronic control circuit particularly adapted for speed regulation of an electromagnetic eddy-current slip-coupling K driven by a prime mover PM and driving a load L. Exemplary physical forms of the type of slip coupling for which F is the exciting coil are shown in United States Patents 1,982,461 and 2,286,777, and Reissue 22,432. The field coil F of the coupling is variably energized by means of a thyratron tube or triode 1 having a transformer 3 in its plate circuit. A back rectifier tube 5 is shunted across the coil F to smooth out pulsations of the flow of D. C. exciting current through F. The conductivity of tube 1 is controlled by a grid-signal consisting of an A. C. rider on a varying D. C. bias. The A. C. rider is supplied from a transformer 7 connected across a voltage divider 9. A phase-shifting capacitor 11 is connected between the voltage divider and the transformer. The adjusting arm 13 of the voltage divider connects through a grid-current limiting resistor 15 to the control grid 17 of the thyratron 1. A small capacitor 19 is provided between the control grid 17 and the cathode 21 of tube 1 to by-pass A. C. transients induced in the grid circuit of tube 1 by the plate circuit currents.

The D. C. bias for tube 1 is supplied by output conductors 23 and 25 of a bridge circuit. This bridge circuit, better shown in Fig. 2, consists of resistors 27 and 29 connected in series with one another and to the conductors 23 and 25, respectively; and of a primary triode T-1 and a resistor 31 connected in series with one another and to the conductors 23 and 25, respectively. A constant D. C. bridge input is provided by a positive conductor 35 connected intermediate resistors 27 and 29, and by a negative conductor 37 connected intermediate resistor 31 and the triode T-1. The D. C. bias appearing across conductors 23 and 25 at the output of the bridge is a function of the conductivity of the triode T-1. If the voltage drop across the triode T-1, which is a variable-impedance device, is less than the voltage drop across the resistor 31, then conductor 23 is negative with respect to conductor 25.

Conductor 23 is normally negative and the A. C. rider appearing across 9 is approximately 90° out of phase with the plate voltage of the thyratron 1. As the voltage of conductor 23 is driven in a positive direction, the A. C. rider is advanced relative to the plate voltage of the thyratron 1 to increase its conductivity and thereby increase the excitation of the field coil F. The coupling in turn is tightened with increase in the excitation of its field coil. Thus, correcting force applied to the system is varied by varying the grid bias of the primary triode T-1.

Tube T-1 is controlled by a grid-signal consisting of a first D. C. component indicated by S, essentially the condition-responsive component, and a second component indicated by C herein termed the corrective reference component. The first component S is made up of a D. C. voltage continuously responsive to the regulated condition or speed, an adjustable reference or speed setting D. C. voltage and an anti-hunt D. C. voltage responsive to the rate of change in the controlled condition, that is, the acceleration and deceleration of the driven member of the slip-coupling.

Referring again to Fig. 1, the D. C. voltage continuously responsive to speed is supplied by an A. C. generator G feeding to a transformer 39 and driven by the driven member of the coupling of which F is the field. The output of the transformer 39 is rectified by a rectifier tube 41, filtered by means of a shunt capacitor 43, and impressed across a voltage divider 45. A conductor 47 leads from the adjusting arm 49 of voltage divider 45 to a grid-current limiting resistor 51 which is connected to the control grid or control element 53 of tube T-1.

The anti-hunt D. C. voltage is provided by a circuit consisting of a transformer 54 supplied by the generator G and feeding through a rectifier 55 to a resistor 57. A voltage divider 59 and a capacitor 61 are connected in series with one another around the resistor 57. Elements 59 and 61 form a resistance-capacitance differentiating network supplying a D. C. potential across 59 proportional to the rate of change in the voltage across resistor 57. The anti-hunt circuit operates to provide a positive or negative signal depending upon whether the generator G is accelerating or decelerating and solely proportional to the rate of acceleration or deceleration. The connections are such that upon acceleration, a transient correcting signal is supplied tending to slow down the acceleration of the regulated machinery, and vice versa. The adjusting arm 63 of voltage divider 59 is connected to the negative side of the speed-responsive voltage divider 45. A conductor 65 leads from a point intermediate the voltage divider 59 and the capacitor 61 to the circuit providing the speed-setting D. C. voltage. Capacitor 61 is connected to the negative side of 57.

The speed-setting circuit consists of a voltage divider 67 connected across a constant D. C. voltage supply. Conductor 65 is connected to the adjusting arm 69 of voltage divider 67, and a conductor 71 leads from the positive side of the voltage divider. The D. C. voltage supplied across the voltage divider 67 should be well regulated because of the high sensitivity of this control. A suitable voltage supply circuit is shown on page 223, Fig. 6, of the "Radiotron Designer's Hand Book," third edition, by F. Langford Smith, published by The Wireless Press for Amalgamated Wireless Valve Company, Ltd., 47 York Street, Sydney, Australia, and distributed in the U. S. A. by the Radio Corporation of America. This circuit holds the output accurately to one part in 50,000. It is also contemplated that the regulated voltage supply circuit will supply the other D. C. voltage requirements of the circuit, such as the input to the bridge.

The conductor 71 leading from the positive side of the speed-setting voltage source 67 is connected to one side of a voltage divider, generally designated 73. The other side of this voltage divider is connected to the cathode 75 of the primary triode T-1 or the negative bridge input conductor 37. Thus, the grid circuit for tube T-1 includes the speed responsive voltage source 45, the anti-hunt voltage source 59, the speed-setting voltage source 67 and the voltage divider 73.

As mentioned heretofore, the grid bias of the primary control triode T-1 includes a component termed the corrective reference. This component is supplied by a closed loop circuit and impressed across the voltage divider 73 in the grid circuit of T-1. The loop circuit essentially comprises a first triode-controlled circuit part I and a second triode-controlled circuit part II arranged so that a change in the operation of part I causes a change in the operation of part II and a change in the operation of part II causes a change in the operation of part I. Hence the use of the term closed loop circuit.

Part I of the loop consists of a pentode T-2, having its cathode 76 connected to the adjusting arm 77 of the voltage divider 73 and having its plate 78 connected through a resistor 79 to the positive bridge input conductor 35. A pentode is employed in circuit I because its characteristics are more desirable than those of a triode, although it will be understood the term triode is generic to pentode and that broadly the circuit may be considered as being triode-controlled. For purposes of simplifying the disclosure, the voltage divider generally designated 73 will be considered as divided with a resistor R-1 on one side of its adjusting arm and a resistor R-2 on the other side of the adjusting arm. Resistor R-1 connects with the cathode 75 of T-1 and the negative bridge input at 37. Thus, the plate circuit for the triode T-1 includes the plate resistor 79, a cathode resistor R-1 and the D. C. voltage supply for the bridge.

Part II of the loop is a cathode follower circuit consisting of a triode T-3 and cathode resistance afforded by a resistor R-3 and the resistors R-1 and R-2. An independent voltage supply is provided for T-3 by a positive conductor 81 and a negative conductor 83. A well regulated D. C. voltage supply should be employed. Resistor R-3 is connected direct to the cathode 85 of triode T-3 and to the resistor R-1 on the side thereof opposite the adjusting arm 77. The negative supply conductor 83 is connected to the resistor R-2 at its junction with lead 71. Thus, the plate circuit for T-3 includes conductors 81 and 83 and resistors R-1, R-2 and R-3 connected in series on the cathode side of T-3.

The grid-bias for the first pentode T-2 of the loop is made up of the component S, essentially the condition-responsive signal, and a component appearing across R-2. A grid-current limiting resistor 87 connects the grid 89 of T-2 with the lead 47. Thus, the grid circuit for T-2 includes the speed-responsive voltage source 45, the anti-hunt voltage source 59, the speed-setting voltage source 67 and resistor R-2. The voltage appearing across R-2 is a function of the conductivity of triode T-3, it being assumed no grid-currents exist.

The grid circuit for the second triode T-3 of the loop circuit is formed by a grid-current limiting resistor 91 connecting the grid 93 of T-3 with the plate 78 of T-2. The grid-circuit of T-3 includes resistors R-1 and R-3 and the triode T-2, or conversely, the bridge input across conductors 35 and 37, resistor 79 and resistor R-3. Thus, the grid bias of T-3 is an inverse function of the conductivity of T-2. A regenerative feedback effect on T-2 results from the resistor R-2 since the voltage appearing across this resistor is a function of the conductivity of T-3. It will be noted that R-1 has a degenerative effect on the grid bias of T-3 in the sense that as the drop across T-2 increases, the drop across R-1 resulting from current through T-2 decreases.

The loop circuit also includes means for preventing rapid changes, and thereby minimizes hunting or excessive acceleration. A capacitor 95 is connected between the grid 93 of triode T-3 and the negative supply conductor 83 for this triode. This capacitor has a relatively high capacitance and cooperates with the grid-current limiting resistor 91 to form a resistance-capacitance integrating circuit having a relatively large time constant. For example, a one megohm grid-current limiting resistor and a four microfarad capacitor would have a time constant of four seconds. The effect of the capacitor is to prevent the grid of T-3 from immediately following sharp changes in the operation of T-2 caused by sharp changes in the component S of its grid bias.

Exemplary items and values for the elements of the loop circuit might be as follows:

Tube T-2, 6SH7 (RCA)
Tube T-3, 6SN7 (RCA)
Resistor 79, 100,000 ohms
Resistor 73, 5,000 ohms
Resistor R-3, 15,000 ohms
Capacitor 95, 4 microfarads
Resistor 91, 1 megohm The bridge arms might be as follows:

Triode T-1, 6N7 (RCA)
Resistor 27, 50,000 ohms
Resistor 29, 200,000 ohms
Resistor 31, 300,000 ohms Numeral 97 indicates a connection for the screen grid of tube T-2, the suppressor grid of which is not shown but is obvious. Numeral 99 indicates a voltage regulator tube for wires 35 and 37; and 101 is a similar tube for wires 81 and 83.

Operation is as follows:

The driving member of the slip-coupling (for which F is the field coil) is driven at a speed in excess of the desired constant speed, for example, by an A. C. motor. The driven member of the coupling is coupled to the generator G and to a load which is to be driven at a predetermined constant speed. The excitation of the field coil F is adjusted to provide this speed. Adjustment is had at the speed-setting voltage divider 67 which varies the grid bias of the primary control tube T-1 to provide the necessary exciting current. Tube T-1 controls the D. C. component of grid signal for the thyratron 1 and thereby its conductivity.

Assume that after the speed has been set for a given load, the load torque increases thereby causing a decrease in speed for the driven member of the slip-coupling. A deviation apepars in the D. C. voltage across the voltage divider 45 providing the speed-responsive signal, and the grid 53 of the tube T-1 is driven in a negative direction. Also, a transient anti-hunt signal appears across the voltage divider 59 which temporarily exaggerates the reduction in the grid bias of tube T-1. As T-1 is driven in a negative direction, its impedance increases thereby causing an increase in the voltage drop across T-1 and a reduction in the voltage drop between output conductors 23 and 25 of the bridge circuit, that is, conductor 23 becomes relatively less negative with respect to conductor 25. Thus, the firing angle of the thyratron 1 is advanced to cause tube 1 to increase conduction and increase the excitation of the coil F for the slip-coupling. The slip-coupling transmits increased torque to compensate for the increase in load torque thereby bringing the speed of the driven member back to its original value.

As the speed of the driven member returns to its original value, the deviation in the speed-responsive signal to the tube T-1 is reduced so that the bias of T-1 would tend to return to its original value. If the control did not have the closed loop circuit providing a corrective reference, the coupling would eventually assume an average speed slightly less than the original speed, the difference being determined by the amplification of the speed-responsive signal and the change in torque.

The closed loop operates to eliminate the aforesaid difference and return the actual speed to the desired speed regardless of the new torque. The initial deviation in the speed-responsive signal is also applied to grid 87 of the triode T-2 in part I of the loop, hence a speed-deviation is reflected in the operation of the loop. As component S decreases, the grid 87 of T-2 is driven in a negative direction causing less current to flow through T-2. This reduction of plate current in turn causes the grid 93 of the other loop triode T-3 to be driven in a positive direction so that more current flows through T-3. An increase in the plate current of T-3 causes a greater voltage to appear across R-2 which is in the grid circuit of T-2, the polarity of this voltage being such as to drive the grid of T-2 in negative direction. Thus, there is a regenerative feedback effect in the loop. The effect of the speed-responsive component S on T-2 in part I of the loop is supplemented by the second part II of the loop, and component S may return to its original value determined by the desired speed. The amount of feedback is determined by the size of R-2 which in turn is set by adjustment of the voltage divider 73.

In addition to the above, a stabilizing degeneration occurs since that portion of the grid-signal for T-3 appearing across R-1 and caused by conduction of T-2 decreases as the conductivity of T-2 decreases and the voltage thereacross increases. The amount of degeneration depends upon the size of R-1 as determined by adjustment of the voltage divider 73. It will be noted that as regeneration is increased upon adjustment of the voltage divider, degeneration decreases. That is, if R-2 is increased, R-1 is decreased.

As a whole, the loop circuit provides regenerative feedback through R-1 and R-2 to the grid of the primary triode T-1, the amount of feedback being determined by the position of the adjusting arm 77. Thus, the feedback or amplification may be readily adjusted. Moreover, the feedback is smoothly adjustable through such values as to produce either positive or negative regulation at the slip-coupling. If the change in the speed-responsive component S produces a relatively small but similar change in the corrective reference component C, then relatively poor positive regulation is obtained (see curve X of Fig. 3). If the change in component S produces a relatively large change in component C, then negative regulation results (see curve Y of Fig. 3). It will be seen that the voltage divider 73 determines the character of the regulation, and that by properly adjusting the arm 77, the regulation can be made to very closely approach the ideal represented by the level curve Z of Fig. 3.

Experience has shown this control can be adjusted to hold within the order of 1 part of 50,000. In speed control, a shock load applied to the driven member of the coupling will cause a temporary speed decrease, the duration of which will depend upon the damping characteristics of the control.

Some damping is required to minimize hunting as distinguished from regulation. This is provided by the capacitor 95 in the grid circuit of triode T-3. The capacitor slows down the response of T-3 to rapid changes in the operation of T-2 caused by rapid changes in the speed-setting voltage or speed-responsive voltage. It probably eliminates the effects of the anti-hunt voltage on the closed loop circuit, but the anti-hunt voltage does have an effect on the primary triode T-1, hence is desirable. It should be noted that the capacitor 95 in cooperation with the grid-current limiting resistor 91 also acts as limiting factor on the rate of acceleration when the speed-setting voltage divider is given a large rapid change and thus protects against overload the prime mover for the slip coupling.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. In a regulating control of the type wherein the energization of controlled apparatus is varied in accordance with variations of a condition produced by the apparatus; a control circuit comprising variable-impedance means connected to vary the energization of the controlled apparatus, said variable-impedance means having a control element responsive to a D. C. control signal for varying the impedance of the variable-impedance means with variations of the control signal, a voltage source producing a voltage responsive to the regulated condition connected to said control element through a circuit providing relatively fast response at the variable-impedance means to variations of the voltage source, and a relatively slow-response high-gain D. C. amplifier comprising a triode having an anode, a cathode and a control grid, an anode-cathode circuit for the triode, a resistor connected in said anode-cathode circuit and between the control element and the variable-impedance means, connections from the voltage source to the control grid of said triode forming a grid circuit therefor, and a resistance-capacitance time-delay circuit connected in the grid circuit for the triode.

2. In a regulating control of the type wherein the energization of controlled apparatus is varied in accordance with variations of a condition produced by the apparatus; a control circuit comprising a first triode having an anode, a cathode and a control grid, an anode-cathode circuit for the first triode connected to control the energization of the controlled apparatus, a voltage source producing a voltage responsive to the regulated condition connected to the control grid of the first triode through a grid circuit providing relatively fast response at the first triode to variations of the voltage source, and a relatively slow-response high-gain D. C. amplifier comprising a resistor and a second triode having an anode, a cathode and a control grid, an anode-cathode circuit for the second triode, said resistor being connected in said latter anode-cathode circuit and in the grid circuit of the first triode, connections from said voltage source to the control grid of said second triode forming a grid circuit therefor, and a resistance-capacitance time-delay circuit connected in the grid circuit for the second triode, said first resistor also being connected in the anode-cathode circuit for the first triode on the cathode side thereof to provide degenerative action.

3. In a regulating control of the type wherein the energization of controlled apparatus is varied in accordance with the variations of a condition produced by the apparatus; a control circuit comprising variable-impedance means connected to vary the energization of the controlled apparatus, said variable-impedance means having a control element responsive to a D. C. control signal for varying the impedance of said variable-impedance means with variations of the control signal, a voltage source producing a voltage responsive to the regulated condition connected to said control element through a circuit providing relatively fast response at the control means to variations of the voltage source, and a relatively slow-response D. C. regenerative circuit having an output connected to said control element and an input connected to said voltage source to provide relatively sensitive delayed response at the variable-impedance means to variations of the variable-voltage source, said regenerative circuit including an adjustable resistor for varying the regenerative effect of the regenerative circuit.

4. A regenerative circuit comprising an amplifier stage and a cathode follower stage, the amplifier stage comprising a first resistor and a first triode having an anode, a cathode and a control grid, an anode-cathode circuit for the first triode including said first resistor, output connections from the first resistor, input connections to the control grid of said triode forming a grid circuit therefor, the cathode follower stage comprising a second resistor and a second triode having an anode, a cathode and a control grid, an anode-cathode circuit for the second triode including said second resistor, said second resistor being connected on the cathode side of said second triode, a connection from the anode of the first triode to the control grid of the second triode and a connection between the cathodes of the triodes forming a grid circuit for the second triode, and said second resistor being series connected in the grid circuit of the first triode to provide regenerative feed-back to the first triode and being isolated from the anode-cathode circuit of the first triode.

5. A regenerative circuit as set forth in claim 4 wherein said first resistor is connected in the anode-cathode circuit for the first triode on the cathode side thereof and also in the grid circuit of the second triode.

6. A regenerative circuit as set forth in claim 5 wherein the first and second resistors are constituted by a voltage divider, the voltage divider having an adjusting arm connected to the cathode of the first triode so that the regenerative effect of the circuit may be varied.

7. A regenerative circuit as set forth in claim 4 further including a third resistor connected between the anode of the first triode and the control grid of the second triode, and a capacitor connected between the control grid of the second triode and the anode side of the first resistor, said resistor and said capacitor forming a time-delay circuit adapted to delay the response at the output of the regenerative circuit to changes at the input thereof.

8. In a regulating control of the type wherein the energization of controlled apparatus is varied in accordance with variations of a condition produced by the apparatus; a control circuit comprising a first triode connected to vary the energization of the controlled apparatus, said triode having a control grid responsive to a D. C. control signal for varying the impedance of the variable-impedance means with variations of the control signal, a voltage source producing a voltage responsive to the regulated condition connected to the control grid through a grid circuit providing relatively fast response at the first triode to variations of said voltage source, and a relatively slow-response D. C. regenerative circuit comprising an amplifier stage and a cathode follower stage, the amplifier stage comprising a first resistor and a second triode having an anode, a cathode and a control grid, an anode-cathode circuit for the second triode including said first resistor, said first resistor being connected in the grid circuit of the first triode, connections to the control grid of said second triode from the voltage source forming a grid circuit for the second triode, and the cathode follower stage comprising a second resistor and a third triode having an anode, a cathode and a control grid, an anode-cathode circuit for the third triode including said second resistor, a connection from the anode of the second triode to the control grid of the third triode and a connection between the cathodes of the second and third triodes forming a grid circuit for the third triode, said second resistor being series connected in the grid circuit of the second triode and being isolated from the anode-cathode circuit of the second triode.

9. A control as set forth in claim 8 wherein said first resistor is connected in the anode-cathode circuit for the second triode on the cathode side thereof and in the grid circuit of the third triode.

10. A control as set forth in claim 9 wherein the first and second resistors are constituted by a voltage divider, the voltage divider having an adjusting arm connected to the cathode of the second triode in order to vary the regenerative effect of the regenerative circuit.

11. A control circuit as set forth in claim 10 further including a resistor connected between the anode of the second triode and the control grid of the third triode, and a capacitor connected between the third triode control grid and the anode side of the first resistor to provide a time-delay circuit adapted to slow the response at the output of the regenerative circuit to changes at the input thereof.

12. A control as set forth in claim 8 further including a rate-of-change circuit comprising a second capacitor and a fourth resistor series connected with one another, input connections to the rate-of-change circuit being made across the series combination of the resistor and capacitor from the voltage source and output connections from the rate-of-change circuit being made from said fourth resistor to the control grid of the first triode.

RALPH L. JAESCHKE.

References Cited in the file of this patent

UNITED STATES PATENTS

| Number | Name | Date |
| --- | --- | --- |
| 2,443,541 | Neustadt | June 15, 1948 |
| 2,506,266 | Cage | May 2, 1950 |
| 2,519,377 | Jenkins | Aug. 22, 1950 |
| 2,523,046 | Montgomery | Sept. 19, 1950 |
| 2,523,047 | Halter | Sept. 19, 1950 |
| 2,528,569 | Young | Nov. 7, 1950 |